H. W. WISTNER.
AUTOMOBILE ENGINE.
APPLICATION FILED NOV. 18, 1916.
1,230,257.
Patented June 19, 1917.
2 SHEETS—SHEET 1.
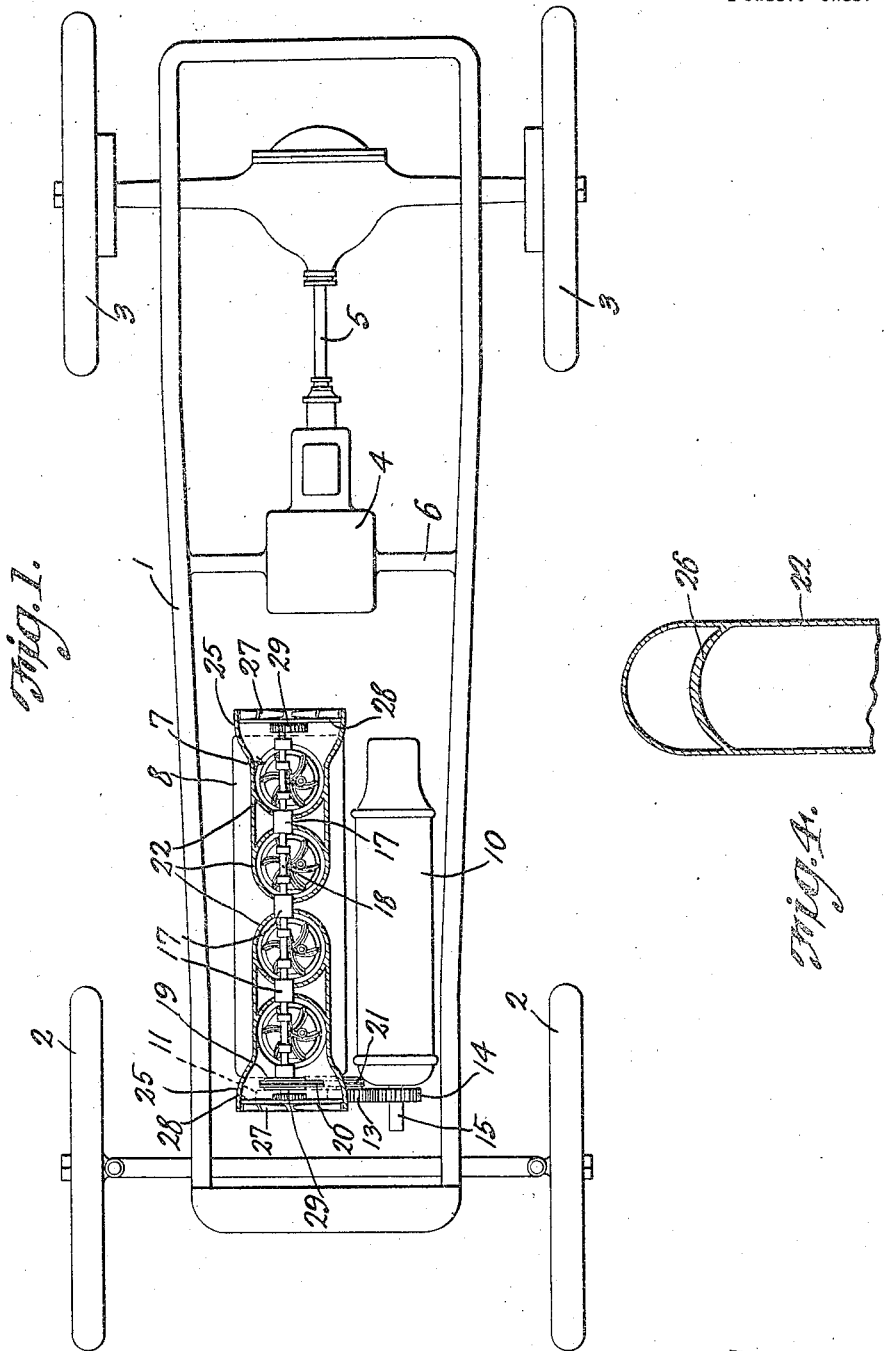
Witnesses
H. W. Wistner Inventor
by Attorneys

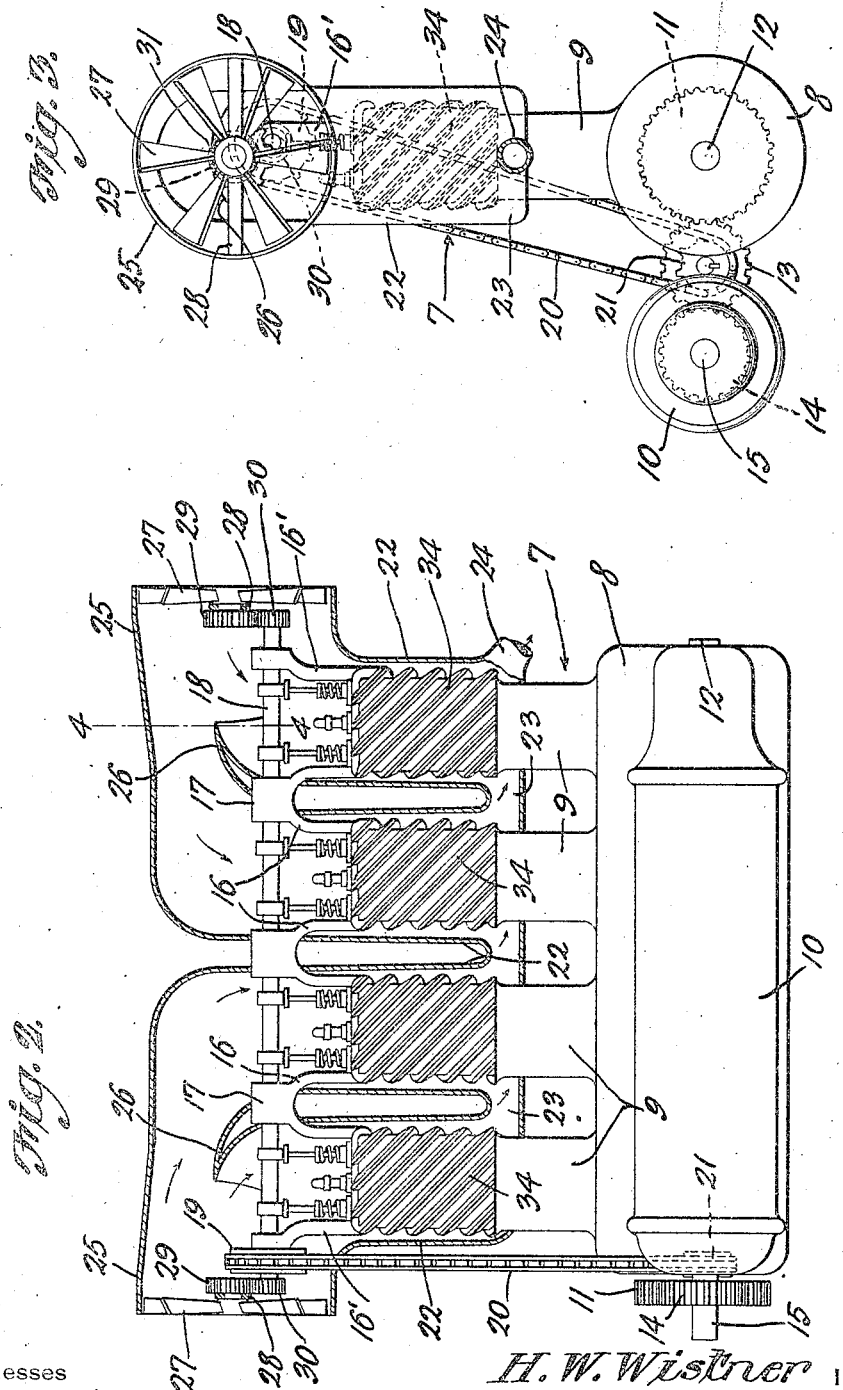

UNITED STATES PATENT OFFICE.

HARRY WILLIAM WISTNER, OF OGDEN, UTAH.

AUTOMOBILE-ENGINE.

1,230,257.   Specification of Letters Patent.   Patented June 19, 1917.

Application filed November 18, 1916. Serial No. 132,117.

*To all whom it may concern:*

Be it known that I, HARRY W. WISTNER, a citizen of the United States, residing at Ogden, in the county of Weber and State of Utah, have invented a new and useful Automobile-Engine, of which the following is a specification.

The present invention appertains to engines, and aims to provide certain new and useful improvements in engines for automobiles and the like.

It is the object of the invention to provide novel and improved means for cooling the engine cylinders by air.

The present engine is adapted especially for use in operating an electric generator which is connected to a motor for actuating the rear propelling wheels of the automobile.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of an automobile chassis, illustrating the engine cooling device in section.

Fig. 2 is an enlarged side elevation of the engine illustrating the air jackets in section.

Fig. 3 is a rear end view of the engine.

Fig. 4 is a sectional detail taken on the line 4—4 of Fig. 2.

The chassis illustrated in Fig. 1 embodies a frame 1 carried by the steering wheels 2 and rear propelling wheels 3, and an electric motor 4 is carried by the frame and connected by a shaft or other suitable connection 5 with the rear wheels through the medium of the usual differential mechanism. The motor 4 is carried by a suitable transverse hanger 6 with which the frame 1 is provided between its ends.

The internal combustion engine is designated generally by the reference character 7, and includes a crank casing 8 and upstanding cylinders 9 of which there may be any suitable number, and a plurality of engines can be used if desired. At one side of the engine 7 is an electric generator 10 operated by the engine for supplying current to operate the motor 4; and through the medium of a suitable controller (not shown) the operation of the motor can be controlled to a nicety for providing ease and flexibility of operation. A spur gear 11 is keyed to the crank shaft 12 of the engine and meshes with an idler spur gear 13 which in turn meshes with a spur gear 14 keyed upon the transverse shaft 15 of the generator 10, whereby to couple the generator to the engine.

Standards 16 of arch form are carried by the cylinders and other standards 16' at the ends, and said standards have bearings 17 for a longitudinal cam shaft 18 that operates the intake and exhaust valves in the heads of the cylinders, the details of which need not be considered. A sprocket wheel 19 secured upon the shaft 18 near the forward end thereof is connected by an endless sprocket chain 20 with a sprocket wheel 21 secured upon the same shaft as the idler gear 13, whereby the cam shaft 18 is operated when the crank shaft of the engine rotates.

The engine cylinders are air cooled, and for this purpose, an upright cylindrical air jacket 22 of sheet metal or other suitable material surrounds each cylinder, and the jackets 22 are connected at their lower ends by connections 23, which with the lower ends of the jackets provide a discharge manifold for the air having an outlet 24 at the rear end or at the rear side of the rear jacket 22 through which the heated air can be discharged. With the four cylinder engine as illustrated, the jackets 22 are arranged in pairs for the two forward and two rear cylinders 9, and the forward and rear pairs of jackets 22 have their upper ends extending or curved angularly forward and rearwardly, respectively, and merging or united into funnels 25 of larger diameter than the jackets 22. The funnel 25 of the front pair of jackets 22 projects forwardly to receive air from the front of the engine, while the funnel 25 of the rear jackets 22 projects rearwardly to receive air from the rear of the engine. The adjacent walls of each pair of jackets 22 have their upper ends united, as at 26, and curved toward the respective funnel 25, the portion 26 being arched transversely as well as curved longitudinally toward the funnel. The portions 26 of the two pairs of the two jackets serve to split the inflowing streams of air so that the air flows downwardly through the several jackets 22.

Air is forced into the funnels 25 by means of rotary fans 27 mounted in the mouths thereof, and carried by suitable brackets 28 with which the funnels are provided. The fans 27 carry spur gears 29 which mesh with spur gears 30 secured upon the ends of the cam shaft 18, in order that both fans will be operated when the crank shaft rotates.

The cylinders 9 are provided upon their peripheries within the air jackets 22 with spiral outstanding flanges 34 to give the downwardly flowing streams of air whirling motions, to assist in the cooling action, and said flanges being cooled by the air will materially assist in cooling the walls of the cylinders.

If desired, the jackets 22 and their funnels 25 can be formed in two side sections secured together in any suitable manner, in order that the sections can be readily applied to and removed from the engine.

Having thus described the invention, what is claimed as new is:—

1. An air cooling device for engines embodying air jackets to inclose the cylinders of an engine and united at one end to provide a discharge manifold for the air, the other ends of the jackets extending angularly and merging into a funnel, the adjacent walls of the jackets being united by a portion curved toward said funnel for dividing the air.

2. The combination with the cylinders of an engine, of air jackets inclosing them and united at one end to provide a discharge manifold for the air, the other ends of the jackets extending angularly and merging into a funnel, and a fan rotatable within the mouth of the funnel for forcing air into the same, the adjacent walls of the jackets being united by a portion curved toward the funnel for dividing the air.

3. The combination with the cylinders of an engine, of air jackets inclosing them and united at one end to provide a discharge manifold for the air, the jackets being arranged in sets, the jackets of each set having angularly extending portions at their other ends merging into a funnel, the funnels of the two sets of jackets extending in opposite directions, and fans rotatable within the mouths of the funnels for forcing air into the same, from opposite directions.

In testimony that I claim the foregoing as my own, I have hereto affixed my signature in the presence of two witnesses.

HARRY WILLIAM WISTNER.

Witnesses:
W. M. JOHNSON,
W. H. MCBEAN.